United States Patent Office 3,654,273
Patented Apr. 4, 1972

---

3,654,273
TRISUBSTITUTED TRIAZINES
Paul D. Schuman, Eugene C. Stump, Jr., and Stephen Rochow, Gainesville, Fla., assignors to PCR, Inc.
No Drawing. Continuation-in-part of application Ser. No. 655,713, July 6, 1967. This application May 31, 1968, Ser. No. 733,304
Int. Cl. C07d 55/50
U.S. Cl. 260—248 CS     5 Claims

ABSTRACT OF THE DISCLOSURE

A series of high molecular weight fluorinated alkyl trisubstituted triazines is disclosed. They are fluids having outstanding fire resistance, thermal stability, lubricity, and which exhibit a wide fluid range, which may be varied dependent upon the nature of certain disclosed polyfluoroalkyl substituents on the 2, 4 and 6 position of the s-triazine ring.

RELATED APPLICATION

This is a continuation-in-part of our copending application Ser. No. 655,713 filed July 6, 1967, now abandoned, bearing the same title.

BACKGROUND OF THE INVENTION

Fireproof and thermally stable fluids have been sought for some time for use as hydraulic fluids in aircraft and for other purposes where extremes in environmental conditions require a fluid which exhibits good lubricity combined with thermal and oxidative stability. Although as a general proposition it is known that fluorinated alkyl compounds tend to be oxidatively and thermally stable, a fluid, trisubstituted triazine, such as we now propose, has not been disclosed.

The preparation of lower molecular weight fluorinated 2,4,6-tri-substituted triazines is known in the art. See, for example, Reilly and Brown, J. Org. Chem. 22, 698 (1957), and Brown, Schuman and Turnbull, J. Org. Chem., 32, 231 (1967).

The lower molecular weight fluorinated triazines are, however, greatly limited in their usefulness as lubricating or hydraulic fluids. The requirements of hydraulic fluids for aircraft are such that they must have a wide fluid range and low volatility, and at the same time they must be inert and noncorrosive. Such a class of materials is difficult indeed to find.

SUMMARY OF THE INVENTION

We have invented a series of highly thermally and oxidatively stable fluids useful as hydraulic media. Their excellent properties of lubricity are combined with the desirable characteristics of low volatility, wide fluid range, fire-resistance, oxidative stability, and minimum corrosiveness.

Our novel compositions are trisubstituted triazines of the formula

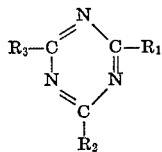

Formula I where $R_1$, $R_2$, and $R_3$ are independently selected from the group consisting of: (a) fluorine-substituted alkyl groups of the formula, $C_nF_{(2n+1)}$ where $n$ is an integer from 1 to 13 except that, where all of $R_1$, $R_2$, and $R_3$ are of the formula $C_nF_{(2n+1)}$, at least one contains five carbon atoms; (b) substituted alkyl groups of the general formula

where $m$ is an integer from 1 to 3, (c) groups of the general formula

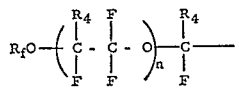

where $R_4$ is selected from the group consisting of F and $CF_3$, $R_f$ is $CF_2R_5$ where $R_5$ is selected from the group consisting of F and $(CF_2)_pX$, X is halogen or hydrogen, $p$ is an integer from 1–7 and $n$ is an integer from 1–8, and (d) groups of the general formula $$C_2F_5O(CF_2CF_2O)_nCF_2-$$

where $n$ is independently an integer from 0 to 20, and in which one of $R_1$, $R_2$ or $R_3$ may be a vinyl, phenyl, or perhalophenyl group.

Our compositions may be made by several different methods. Reaction I demonstrates a method in which a fluorine-containing nitrile is trimerized with heat and pressure to form the triazine. In Reaction I, $R_f$ means independently selected fluorinated groups of the above descriptions, (a), (b), (c), or (d), one having at least five carbon atoms. The reaction may be catalyzed with ammonia. This method is illustrated by Example I.

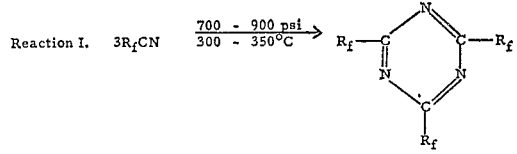

A second method is to cyclize an imidoyl amidine with a fluoroacid anhydride, which permits the creation of dissimilarly substituted triazines. In Reaction II, $R_f$ means independently selected fluorinated groups within the above descriptions (a), (b), (c), or (d). One of them may be an unfluorinated group such as vinyl, phenyl, and perhalophenyl, This method is illustrated by Examples 2–7.

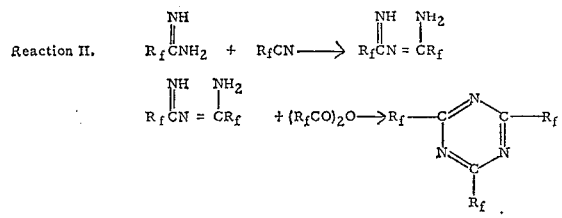

A third method is the condensation of amidines, illustrated Examples 8–10, which follows the general reaction:

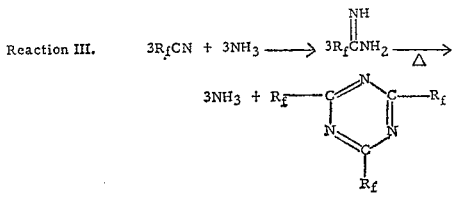

Reaction III may also be used to manufacture dissimilarly substituted compounds, by varying the composition of the $R_f$ groups within the above described groups (a), (b), (c), or (d), and to include vinyl, phenyl, or perhalophenyl groups.

In the following examples, all temperatures are expressed in degrees centigrade unless otherwise stated.

EXAMPLE 1

Preparation of 2,4,6-tris(trichlorooctafluoropentyl)-1,3,5-triazine by trimerization of $Cl(CF_2CFCl)_2CF_2CN$ The nitrile (50 g., 0.145 mole) and ammonia (0.145 mole) were placed in an 80-ml. Fischer-Porter tube and heated overnight at 150°. The volatile material was removed in a vacuum line and the remainder distilled to give 30 g. of unreacted nitrile and 16 g. (80% yield) of 2,4,6-tris(trichlorooctafluoropentyl)-1,3,5-triazine.

EXAMPLE 2

Reaction of $CF_2ClCFClCF_2CFClCF_2C(=NH)NH_2$ with $CF_2ClCFClCF_2CFClCF_2CN$

The amidine (48 g., 0.133 mole) was placed in a 200-ml., 3-neck flask equipped with stirrer, addition funnel and condenser. The nitrile (46 g., 0.133 mole) was added dropwise with stirring. After addition of the nitrile, the mixture was heated to 70° with stirring for 6 hours. The product (91 g., 97% conversion) was assigned to structure

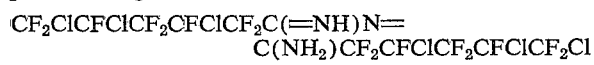
$CF_2ClCFClCF_2CFClCF_2C(=NH)N=$
$C(NH_2)CF_2CFClCF_2CFClCF_2Cl$ on the basis of its infrared spectrum and positive cupric acetate test for imidoyl amidines.

EXAMPLE 3

Preparation of 2,4 - bis(trichlorooctafluoropentyl) - 6 - trifluoromethyl-1,3,5-triazine by reaction of trifluoroacetic anhydride with

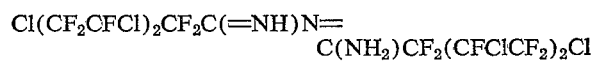
$Cl(CF_2CFCl)_2CF_2C(=NH)N=$
$C(NH_2)CF_2(CFClCF_2)_2Cl$

The imidoyl amidine (91 g., 0.129 mole) was placed in a 300-ml., 3-neck flask equipped with stirrer, condenser and addition funnel. Trifluoroacetic anhydride (100 g., 0.5 mole) was added dropwise with stirring. The mixture was stirred at room temperature for 6 hours and distilled, giving 69 g. of an impure fraction (B.P. 120–138°/0.5 mm.) which was redistilled to give a cut (20 g.) of pure unsymmetrically substituted triazine of Formula I where $R_1$ and $R_2$ are $CF_2ClCFClCF_2CFClCF_2$ and $R_3$ is $CF_3$.

EXAMPLE 4

2-trichlorooctafluoropentyl-4,6-bis(perfluoroheptyl)-1,3,5-triazine $C_7F_{15}C(=NH)N=C(NH_2)C_7F_{15}$ (36.5 g., 0.045 mole) was placed in a 100-ml., 3-neck flask equipped with stirrer, condenser, and addition funnel.

$[Cl(CF_2CFCl)_2CF_2CO]_2O$ (64 g., 0.092 mole) was added dropwise with stirring. The mixture was stirred at room temperature for 6 hours and distilled, giving 28 g. (41% conversion) of a clear liquid identified by elemental and infrared analysis as 2-trichlorooctafluoropentyl - 4,6 - bis(perfluoroheptyl)-1,3,5-triazine.

EXAMPLE 5

2-tetrachloroundecafluorohenptyl-4-trifluoromethyl-6-perfluoroheptyl-1,3,5-triazine $Cl(CF_2CFCl)_3CF_2C(=NH)N=C(NH_2)C_7F_{15}$ (100 g., 0.114 mole) was placed in a 3-neck, 300-ml. flask equipped with stirrer, condenser and additional funnel. Trifluoroacetic anhydride (100 g., 0.5 mole) was added dropwise with stirring at room temperature. The reaction mixture was stirred 8 hours. Distillation yielded a liquid (36 g., 37% conversion) which was identified by its infrared spectrum and by elemental analysis as 2-tetrachloroundecafluoroheptyl - 4 - trifluoromethyl-6-perfluoroheptyl-1,3,5-triazine.

EXAMPLE 6

2,4-bis(pentafluoroethyl)-6-vinyl-1,3,5-triazine

Imidoyl amidine,

$CF_3CF_2C(=NH)N=C(NH_2)CF_2CF_3$ (36 g., 0.119 mole) was placed in a 100-ml., 3-neck flask equipped with additional funnel, condenser and stirrer. Acrylic anhydride (30 g., 0.238 mole) was added dropwise with stirring to the imidoyl amidine at room temperature. The mixture was heated at 50° for 4 hours and at 40° overnight. Distillation gave solid polymers, and 9 g., of a mixture of 2,4-bis(pentafluoroethyl)-6-vinyl-1,3,5-triazine and acrylic acid.

EXAMPLE 7

2,4-bis(pentafluoroethyl)-6-vinyl-1,3,5-triazine

Imidoyl amidine,

$CF_3CF_2C(=NH)N=C(NH_2)CF_2CF_3$ and acrylic anhydride were reacted as described above, except that the product was washed free of acrylic acid prior to distillation. Distillation provided mainly polymers and 9 g. of a liquid identified by IR and NMR as impure (GLC 87%)2,4 - bis(pentafluoroethyl)-6-vinyl-1,3,5-triazine.

EXAMPLE 8

Preparation of 2,4,6-tris(trichlorooctafluoropentyl)-1,3,5-triazine by condensation of

$Cl(CF_2CFCl)_2CF_2C(=NH)NH_2$

The amidine (50 g., 0.14 mole) was heated overnight at 170° in a 500-ml., 1-neck flask with evolution of ammonia. The reaction was carried to completion by heating under full vacuum until ammonia evolution ceased. The viscous liquid product was distilled giving 43 g. (86% conversion) of 2,4,6-tris($CF_2ClCFClCF_2CFClCF_2$)-1,3,5-triazine. The infrared spectrum of this sample was identical to that of the sample obtained by trimerization of the nitrile.

EXAMPLE 9

2,4,6-tris(perfluoroheptyl)-1,3,5-triazine $C_7F_{15}C(=NH)NH_2$ (120 g., 0.29 mole) was placed in a 200-ml., 1-neck flask equipped with magnetic stirrer and condenser. The amidine was heated at 160° C. for 5 hours and then pumped under full vacuum at 140° C. until no more $NH_3$ was evolved (4 hours). Distillation yielded 73 g. (63% conversion) of a clear liquid identified by infrared and elemental analysis as 2,4,6-tris(perfluoroheptyl)-1,3,5-triazine.

EXAMPLE 10

2,4,6-tris(tetrachloroundecafluoroheptyl)-1,3,5-triazine $Cl(CF_2CFCl)_3CF_2C(=NH)NH_2$ (125 g., 0.267 mole) was placed in a 100-ml., 3-neck flask equipped with stirrer and condenser. The amidine was heated at 175° for 22 hours and pumped with full vacuum at 175° until ammonia was no longer evolved. A liquid (94 g., 76% conversion), boiling at about 20°/0.1 mm., was stripped from the viscous product mixture using a vacuum vaporization-condensation apparatus. This was identified by NMR, elemental and infrared analysis as 2,4,6-tris(tetrachloroundecafluoroheptyl)-1,3,5-triazine.

EXAMPLE 11

Triazine of the structure

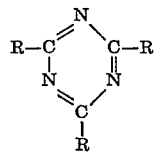

in which R is

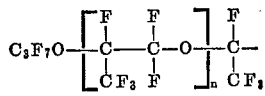

where $n$ is 0 to 10; in this case, 2.

a.

Preparation of 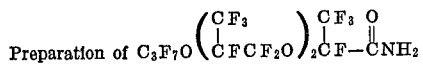

(97 g.) and dry diethyl ether (300 ml.) were added to a 500-ml., 3-neck flask equipped with an ammonia inlet tube, condenser and stirrer. Excess ammonia was bubbled through the stirred solution until the reaction was complete. The solid product (95 g.) was dried and identified by elemental and infrared analysis as $$C_3F_7O\left(\underset{CF_3}{\underset{|}{C}}FCF_2O\right)_2\underset{CF_3}{\underset{|}{C}}F-\underset{||}{\overset{O}{C}}NH_2$$

Conversion to the amide was nearly quantitative.

b.

Preparation of 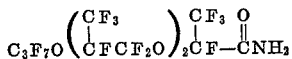

The amide (113 g.) above and $P_2O_5$ (300 g.) were thoroughly mixed and placed in a 500-ml., 1-neck flask fitted with a downward condenser. The mixture was heated to 250° with evolution of a clear liquid product. The crude product (97.5 g.) was distilled, giving 87 g. of the nitrile, B.P. 83°/46 mm. Hg. Conversion to the nitrile was 79%.

c.

Preparation of 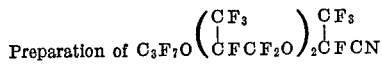

The above nitrile (87 g.) was placed in a 500-ml., 1-neck flask containing a magnetic stirring bar and equipped with a low temperature condenser. Ammonia (46 g.) was condensed into the flask which was then allowed to warm. After 7 hours at reflux, the excess ammonia was stripped leaving 88 g. of the amidine. Conversion to the amidine was nearly quantitative.

d.

Trimerization of 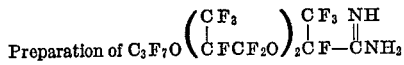

The amidine (97 g.) was placed in a 200-ml., 1-neck flask equipped with a condenser and heated with stirring to 250° for 3 hours. The flask contents were then refluxed at 220° and reduced pressure (200 mm. Hg). The fluid product was distilled giving the symmetrically substituted triazine (72 g.) boiling at 145°/0.1 mm. Conversion to triazine was 76%.

Structure:

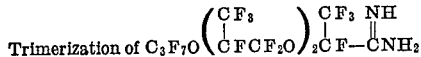

This material had a pour point of −50° F., and the following additional physical characteristics:

| | |
|---|---|
| B.P. ° C./mm. | 145/0.1. |
| $n_D^{20}$ | 1.3018. |
| $d^{20}$ | 1.82. |
| Viscosity at 86° F. | 28.8 cs. |
| Viscosity at 150° F. | 6.9 cs. |
| Viscosity at 212° F. | 2.9 cs. |
| Viscosity slope | 0.94. |
| Flash point ° F. | None observed up to 550. |

EXAMPLE 12

Preparation of mixed trisubstituted triazines of the formula

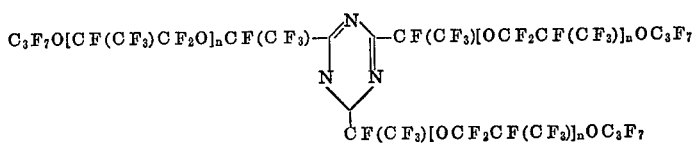

in which $n$ varied independently from 0 to 10.

(a) Polymerization of perfluoropropylene epoxide (PFPE)

Darco 12 x 20 activated carbon (7 g.) was placed in a 95 ml. Monel cylinder and heated overnight at 400° C. under vacuum. Pure PFPE (72 g., 0.434 mole) was condensed into the cylinder and allowed to stand at room temperature for 6 days. Volatile material (54 g.) was removed from the cylinder under vacuum and distilled to remove fractions boiling below 100°. The remaining material (41 g.) consisted of a mixture of acid fluorides with the structure

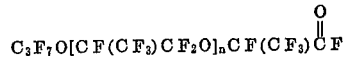

See Moore et al., U.S. Pat. 3,250,808.

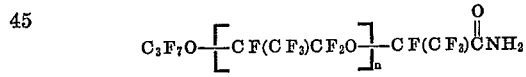

Dry ethyl ether (250 ml.) was placed in a 500-ml., 3-neck flask equipped with stirrer and gas bubbler. A mixture of acid fluorides prepared as above (B.P.>100°) was added (73 g.) and $NH_3$ (119 g.) was bubbled in at room temperature with stirring until no more was taken up. A white precipitate of $NH_4F$ appeared. The reaction mixture was then filtered, and the solvent pumped off, leaving a cloudy, thick liquid (63 g. crude, about 86% conversion).

(c)   $C_3F_7O[CF(CF_3)CF_2O]_nCF(CF_3)CN$

Mixed amides from above (63 g.) and $P_2O_5$ (240 g.) were well mixed and placed in a 500-ml., 1-neck flask set for downward distillation. The flask was heated to a surface temperature of 250–300°. Moderate pumping under vacuum (25 mm.→1 mm.) gave 38 g. of crude, mixed nitriles (about 62% conversion).

(d)   $C_3F_7O[CF(CF_3)CF_2O]_nCF(CF_3)C(=NH)NH_2$

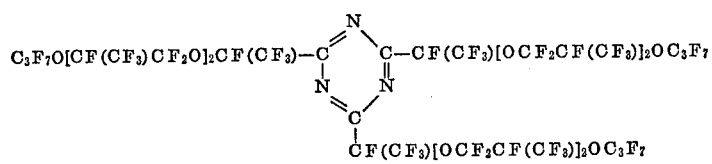

Mixed nitriles from above (45 g.) were placed in a 100-ml., 1-neck flask equipped with Dry Ice condenser and magnetic stirrer. Ammonia (57 g.) was condensed in, and allowed to warm up to reflux for 8 hours. Solvent was pumped off, leaving 30 g. of crude product, about 65% conversion.

(e) Preparation of mixed trisubstituted triazines

The above mixed amidines (37 g.) were put into a 100-ml., 1-neck flask equipped with a condenser and magnetic stirrer, and heated with stirring to 195° overnight. The mixture was refluxed 7 hours at 195°/540 mm. The mixture was distilled to give the following fractions:

| | B. P. °C./mm. Hg. | Weight, g. |
|---|---|---|
| Fraction: | | |
| 1 | 52/0.14 | 2 |
| 2 | 84/0.33 | 2 |
| 3 | 108/0.25–125/0.20 | 5 |
| 4 | 125–152/0.20 | 12 |
| 5 | Above 152/0.20 | 12 |

EXAMPLE 13

Preparation of mixed trisubstituted triazines of the formula

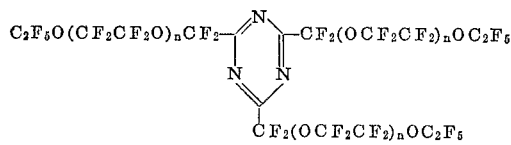

in which $n$ varies independently from 0–20.

A mixture of perfluorinated polyethers of the structure

(where $n=0$ to approximately 20), prepared by polymerization of tetrafluoroethylene oxide, may be converted to the corresponding amide mixture by placing the acid fluoride mixture in ether solution and bubbling ammonia gas into the stirred solution until no more ammonia is consumed. The mixed amides are separated from the insoluble ammonium fluoride by filtration and the ether removed by stripping under vacuum. Conversions of greater than 90% may be obtained.

(b) $\quad C_2F_5(CF_2CF_2O)_nCF_2CN$

The mixed amides from above may be converted to the corresponding nitrile by dehydration with phosphorus pentoxide. In carrying out the reaction the amides from the preceding sections are mixed thoroughly with an excess of $P_2O_5$. The mixture is heated to 200–300° and the nitriles distill from the reaction flask, first at atmospheric pressure and then at reduced pressure, which removes higher boiling fractions.

(c) $\quad C_2F_5O(CF_2CF_2O)_nCF_2C(=NH)NH_2$

The mixed nitriles from the above may be converted to the corresponding mixed amidines by reaction with ammonia. In practice, the nitrile mixture is placed in a flask equipped with a mangetic stirrer and Dry Ice condenser. Excess ammonia is condensed into the flask and the liquid mixture is stirred and allowed to warm to reflux temperature. After reacting overnight, the excess ammonia is pumped off leaving the crude amidine mixture.

(d) Preparation of mixed trisubstituted triazines

The mixed amidines from above may be converted to mixed trisubstituted triazines by heating at 150–200° to remove ammonia. A reflux condenser is used to return the reactants and product to the flask. After evolution of ammonia has ceased, the mixture is cooled to room temperature and volatile material removed under vacuum. The remaining fluid is composed of triazine rings substituted with groups having the structure $$C_2F_5O(CF_2CF_2O)_nCF_2\text{—}$$

(where $n=0$ to about 20).

Table I shows some of the physical properties of several of the compounds we have made.

TABLE I
Physical Properties of Certain Trisubstituted 1,3,5-Triazines

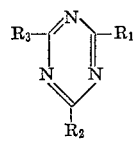

| | | | | Prep.* reaction | Percent conv. | B.P., °C./mm. | $n_D^{20}$ | $d^{20}$ | Viscosity, cs. at— 86° F. | 150° F. | 212° F. | Visc. slope | Flash point, °F. |
|---|---|---|---|---|---|---|---|---|---|---|---|---|---|
| | $R_1$ | $R_2$ | $R_3$ | | | | | | | | | | |
| 1 | $C_5Cl_3F_8$ | $C_5Cl_3F_8$ | $C_5Cl_3F_8$ | I and III | 32,81 | 186/0.4 | 1.4152 | 1.90 | 2,145 | 107.3 | 17.15 | 0.88 | >700 |
| 2 | $C_5Cl_3F_8$ | $C_5Cl_3F_8$ | $CF_3$ | II | 26 | 144/1.0 | 1.4013 | 1.87 | 244.5 | 19.74 | 5.02 | 0.92 | >575 |
| 3 | $C_7F_{15}$ | $C_7F_{15}$ | $C_7F_{15}$ | III | 63 | 132/0.6 | 1.3199 | 1.89 | 41.5 | 7.80 | 2.9 | 1.1 | >550 |
| 4 | $C_7F_{15}$ | $C_7F_{15}$ | $C_5Cl_3F_8$ | II | 41 | 151/1.5 | 1.3504 | 1.88 | 102.2 | 14.14 | 4.35 | 1.0 | 598 |
| 5 | $C_7Cl_4F_{11}$ | $C_7Cl_4F_{11}$ | $C_7Cl_4F_{11}$ | III | 76 | ~220/0.1 | 1.4194 | 1.94 | 39,200 | 899 | 84.5 | 0.83 | |
| 6 | $C_7Cl_4F_{11}$ | $C_7F_{15}$ | $CF_3$ | II | 37 | 122/0.2 | 1.3663 | 1.89 | 158.4 | 18.3 | 4.6 | 1.05 | |
| 7 | $C_{11}F_{23}O_3$ | $C_{11}F_{23}O_3$ | $C_{11}F_{23}O_3$ | III | 76 | 145/0.1 | 1.3018 | 1.82 | 28.8 | 6.9 | 2.9 | 0.94 | >550 |

*I = Trimerization of the nitrile; II = Reaction of anhydride with the imidoyl amidine; III = Conensation of the amidine.

TABLE II
Oxidative stability of 2,4,6-tris(perfluoroheptyl) 1,3,5-triazine

| Sample | Test temp., °F. | Test time, hrs. | 12″ reflux condenser | Fluid loss, percent | Δ wt. of metal specimens (mg./cm.²) | | | | | Remarks |
|---|---|---|---|---|---|---|---|---|---|---|
| | | | | | Silver | Aluminum 2024 alloy | Titanium alloy 6%Al–4%V | 301 stainless steel | M-10 tool steel | |
| 1 | 500 | 48 | No | 27.6 | [1] | | | | | No insolubles. No change in color of fluid. |
| 2 | 500 | 24 | No | 6.8 | −0.01 | +0.01 | 0.00 | 0.00 | +0.02 | Do. |
| 3 | 550 | 24 | No | 5.4 | −0.08 | −0.01 | +0.01 | +0.01 | +0.12 | No insolubles. Fluid slightly yellowed. |
| 4 | 600 | 24 | Yes | 6.9 | [2] ±0.1 | [3] ±0.01 | 0.00 | −0.02 | +0.02 | No insolubles. Fluid yellowish. |
| 5 | 650 | 24 | Yes | 6.4 | [4] ±0.1 | −0.02 | −0.01 | +0.01 | +0.01 | No insolubles. Fluid slightly yellowish. |

[1] No metals.
[2] Duplicate tests gave +0.10 and −0.06.
[3] Duplicate tests gave +0.01 and −0.01.
[4] Duplicate tests gave +0.10 and −0.11.

The oxidative stability of our compounds is demonstrated by the flash points shown in Table I and the data in Table II on 2,4,6-tris(perfluoroheptyl)-1,3,5-triazine.

In collecting the data of Table II, 20 liters of air per hour were passed through 20 ml. samples of the 2,4,6-tris(perfluoroheptyl)-1,3,5-triazine. There was no increase in acid number and no change in viscosity in any of the samples throughout the test.

We do not intend to be restricted to the above specific illustrations and examples of our invention. It may be otherwise varied within the scope of the following claims.

We claim:

1. Trisubstituted triazine of the formula

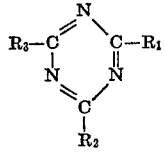

where $R_1$, $R_2$ and $R_3$ are independently selected from groups of the formula

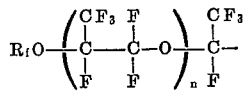

where $R_f$ is $CF_2R_4$ where $R_4$ is selected from the group consisting of F and $(CF_2)_pX$, X is halogen or hydrogen, $p$ is independently an integer from 0–7 and $n$ is independently an integer from 1 to 20.

2. Trisubstituted triazine of claim 1 wherein $n$ is an integer from 1 to 8.

3. Composition of the formula

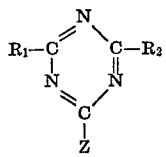

wherein $R_1$ and $R_2$ are independently selected from groups of the formula

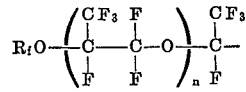

where $R_f$ is $CF_2R_4$ where $R_4$ is selected from the group consisting of F and $(CF_2)_pX$, X is halogen or hydrogen, $p$ is independently an integer from 0–7 and $n$ is independently an integer from 1 to 20 and Z is selected from vinyl, phenyl and perhalophenyl groups.

4.

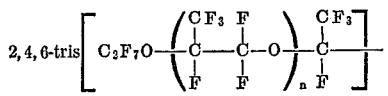

1,3,5-triazine where $n$ is independently 1 to 10.

5. Composition of claim 4 in which $n$ is 2.

References Cited

UNITED STATES PATENTS

| | | | |
|---|---|---|---|
| 2,981,734 | 4/1961 | Ratz et al. | 260—248 |
| 3,038,900 | 6/1962 | Dess | 260—248 |
| 3,086,946 | 4/1963 | Brown | 260—248 X |
| 3,218,270 | 11/1965 | Delman et al. | 260—248 X |
| 3,369,002 | 2/1968 | Griffin | 260—248 X |
| 3,407,232 | 10/1968 | Mitsch | 260—248 X |
| 3,523,118 | 8/1970 | Emerson et al. | 260—248 |

FOREIGN PATENTS

| | | | |
|---|---|---|---|
| 935,787 | 9/1963 | Great Britain | 260—248 |

JOHN M. FORD, Primary Examiner

U.S. Cl. X.R.

252—51, 78; 260—465.6, 544 F, 561 HL, 566 D

PO-1050
(5/69)

UNITED STATES PATENT OFFICE
CERTIFICATE OF CORRECTION

Patent No. 3,654,273  Dated April 4, 1972

Inventor(s) Paul D. Schuman et al

It is certified that error appears in the above-identified patent and that said Letters Patent are hereby corrected as shown below:

In the specification, column 3, line 20, "to" should read --the--.

In the specification, column 3, line 63, "2-tetrachloroundecafluorohenptyl" should read --2-tetrachloroundecafluoroheptyl--.

In the claims, claim 4, column 10, line 16, "$C_2$" should read --$C_3$--.

Signed and sealed this 19th day of September 1972.

(SEAL)
Attest:

EDWARD M. FLETCHER, JR.  
Attesting Officer

ROBERT GOTTSCHALK  
Commissioner of Patents